Nov. 4, 1930. C. A. FASSEN 1,780,181
TREE BRANCH HOLDER
Filed March 15, 1928

Inventor
Charles A. Fassen
By
Attorney

Patented Nov. 4, 1930

1,780,181

UNITED STATES PATENT OFFICE

CHARLES A. FASSEN, OF DETROIT, MICHIGAN

TREE-BRANCH HOLDER

Application filed March 15, 1928. Serial No. 261,756.

My invention pertains to a novel tree branch holder and the object of this invention is to utilize Christmas trees which become valueless through insufficient or broken foliage, by attaching branches which have been trimmed from other trees. The unattractive Christmas trees may be reinstated to their natural splendor for decorating purposes by an even distribution of foliage, by replacing the broken-off branches, and by adding branches to the bare parts. A further object is to construct a tree branch holder provided with a means for conveniently attaching it to the main support or tree trunk and having a portion adapted to resiliently entwine the end of the branch and support it at any desired angle.

With these and other objects in view, my invention is fully disclosed by way of example in the accompanying specification and drawings in which—

Figure 1:
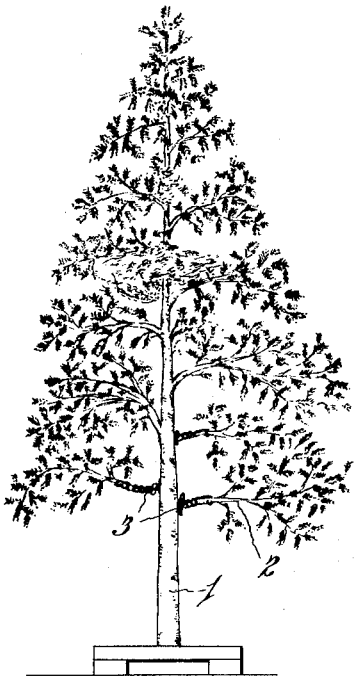
Figure 1 is a side elevation of a tree showing my holder attached thereto.
Figure 2:
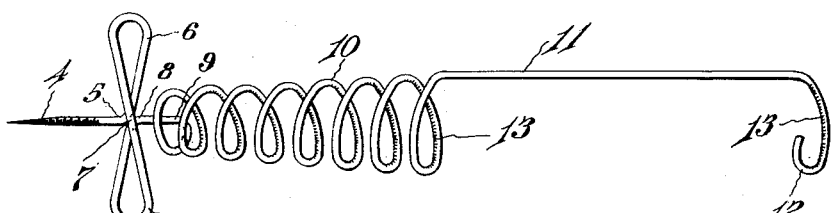
Fig. 2 is a perspective detail of the branch holder.

The numeral 1 indicates the tree trunk or main support and 2 the branches which are attached thereto by the branch holder 3. The holder is constructed in one piece from a wire and having an end 4 adapted to pierce the tree trunk and provided with screw threads for retaining it in the tree trunk. The end 4 is bent outwardly at 5 to form the loop finger pieces 6 in a substantial figure 8. The strand 7 provides sufficient strength for the screwing into the trunk by the manner in which it passes over the angle 5. The metal is turned at 8 and resumes the direction of the end 4 until at 9 it merges into a series of convolutions 10 increasing in diameter towards the other end of the wire. The straight extension 11 is continued from the highest point in the end convolution and is bent at its outer end to form a hook 12. The inner edges of the convolutions and hook are scored or roughened as at 13.

The application of my device is as follows: The screw threaded end 4 is screwed into the tree trunk by means of the finger pieces 6, the end of the branch 2 is inserted in the convolutions 10, and the hook 12 engages the branch at a point remote from the trunk and maintains the branch in its outwardly extending position while the roughened edges 13 prevent the branch from endwise slippage. The finger pieces 6, in addition to providing a convenient means for inserting the holder in the tree trunk, when turned in a vertical position bear against the tree trunk and establish rigidity in the connection of the holder to the tree.

What I claim is:—

1. A holder having a pointed end, a series of convolutions, an arm extending outwardly from the outermost extremity of said convolutions, and a hook on the end of said arm, the convolutions being adapted to receive the end of an inserted member, and the hook being adapted to engage said inserted member at a remote point from the convolutions.

2. A holder having a screwthreaded end, finger pieces, a series of convolutions and a hooked arm extending outwardly from said convolutions, said finger pieces being adapted to butt against a supporting surface for rigidly supporting the holder at the desired angle, and the convolutions and hooked arm being adapted to support an inserted member in the desired position, the inner edges of said convolutions and hook being roughened to prevent endwise slippage.

3. A holder formed from a single wire, said wire being pointed and screwthreaded at one end, finger pieces formed by bending said wire adjacent said pointed end, a series of convolutions formed by bending said wire adjacent said finger pieces and an outwardly extending arm projecting from the outermost extremity of said convolutions, said convolutions and said arm being adapted to support an inserted member at any desired angle.

4. A holder formed from a single wire, said wire being pointed and screwthreaded whereby it is adapted for insertion into a supporting member, finger pieces formed by bending said wire adjacent said pointed end, a series of convolutions formed by bending said wire adjacent said finger pieces, a straight extension formed by said wire and extending outwardly, and a hook formed by bending said wire at its outer end, said convolutions being adapted to support the end of an inserted member and said extension and hook adapted to support said inserted member at a point remote from its end.

In testimony whereof I affix my signature.

CHARLES A. FASSEN.